(12) United States Patent
Henning et al.

(10) Patent No.: US 8,411,071 B2
(45) Date of Patent: Apr. 2, 2013

(54) ELECTRONIC PEN

(75) Inventors: Fabian Henning, Löberöd (SE); Ola Strömberg, Staffanstorp (SE)

(73) Assignee: Anoto AB, Lund (SE)

( * ) Notice: Subject to any disclaimer, the term of this patent is extended or adjusted under 35 U.S.C. 154(b) by 1259 days.

(21) Appl. No.: 12/224,221

(22) PCT Filed: Feb. 21, 2007

(86) PCT No.: PCT/SE2007/000158
§ 371 (c)(1),
(2), (4) Date: Aug. 21, 2008

(87) PCT Pub. No.: WO2007/097692
PCT Pub. Date: Aug. 30, 2007

(65) Prior Publication Data
US 2009/0002346 A1 Jan. 1, 2009

Related U.S. Application Data

(60) Provisional application No. 60/743,361, filed on Feb. 27, 2006.

(30) Foreign Application Priority Data

Feb. 22, 2006 (SE) ..................................... 06000389

(51) Int. Cl.
*G06F 3/033* (2006.01)
(52) U.S. Cl. .......... 345/179; 401/17; 401/195; 401/247; 455/73; 455/550; 361/685; 381/386

(58) Field of Classification Search .......... 345/168–179; 401/195, 247
See application file for complete search history.

(56) References Cited

U.S. PATENT DOCUMENTS

| 6,375,376 B1 * | 4/2002 | Hsu ............................... 401/247 |
| 6,454,482 B1 * | 9/2002 | Silverbrook et al. ......... 401/195 |
| 6,788,982 B1 * | 9/2004 | Lapstun et al. ................. 700/94 |
| 2002/0183014 A1 * | 12/2002 | Takeda et al. .................... 455/73 |
| 2002/0190966 A1 * | 12/2002 | Fermgard ..................... 345/179 |

(Continued)

FOREIGN PATENT DOCUMENTS
GB 2 329 300 A 3/1999
JP 11-168545 6/1999
(Continued)

OTHER PUBLICATIONS

Communication from Japanese Patent Office Action in Japanese Application No. JP 2008-556276 dated Aug. 9, 2011 and translation thereof. (12 pages including 4 pages of communication and 8 pages of translation.

*Primary Examiner* — Alexander Eisen
*Assistant Examiner* — Amit Chatly
(74) *Attorney, Agent, or Firm* — Finnegan, Henderson, Farabow, Garrett & Dunner, LLP

(57) ABSTRACT

An electronic pen has a casing and a tip to be put on a surface. The pen includes a positioning module for detecting the position of the tip on the surface, and an audio module configured to output signals responsive to the detected position of the tip on the surface. The modules form a unitary component mounting unit contained within the casing. The pen also has: an audio box with a speaker, means for connecting the modules, and a locking arrangement for locking the casing.

29 Claims, 16 Drawing Sheets

U.S. PATENT DOCUMENTS

| | | |
|---|---|---|
| 2003/0027589 A1* | 2/2003 | Wennemer et al. ........... 455/550 |
| 2003/0122803 A1 | 7/2003 | Chuang |
| 2004/0246211 A1 | 12/2004 | Perkins et al. |
| 2005/0058497 A1* | 3/2005 | Marschand ..................... 401/17 |
| 2005/0094368 A1* | 5/2005 | Lin ............................... 361/685 |
| 2006/0062416 A1* | 3/2006 | Wu ............................... 381/376 |

FOREIGN PATENT DOCUMENTS

| | | |
|---|---|---|
| JP | 2002-197411 | 7/2002 |
| WO | WO-02/093467 A1 | 11/2002 |
| WO | WO-02/103623 A1 | 12/2002 |
| WO | WO-03/001358 A1 | 1/2003 |
| WO | WO-03/001440 A1 | 1/2003 |
| WO | WO-03/046708 A1 | 6/2003 |
| WO | WO-03/069547 A1 | 8/2003 |
| WO | WO-2005/057471 A1 | 6/2005 |
| WO | WO-2006/004506 A1 | 1/2006 |
| WO | WO-2006/006925 A1 | 1/2006 |

* cited by examiner

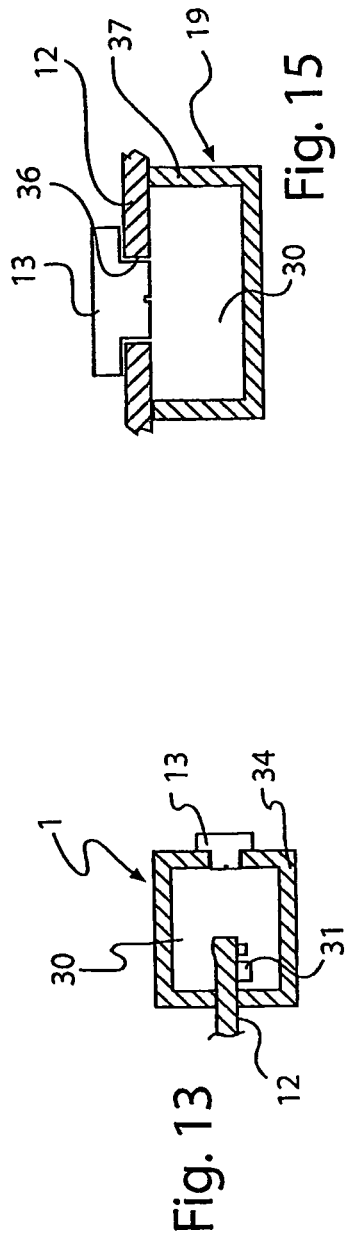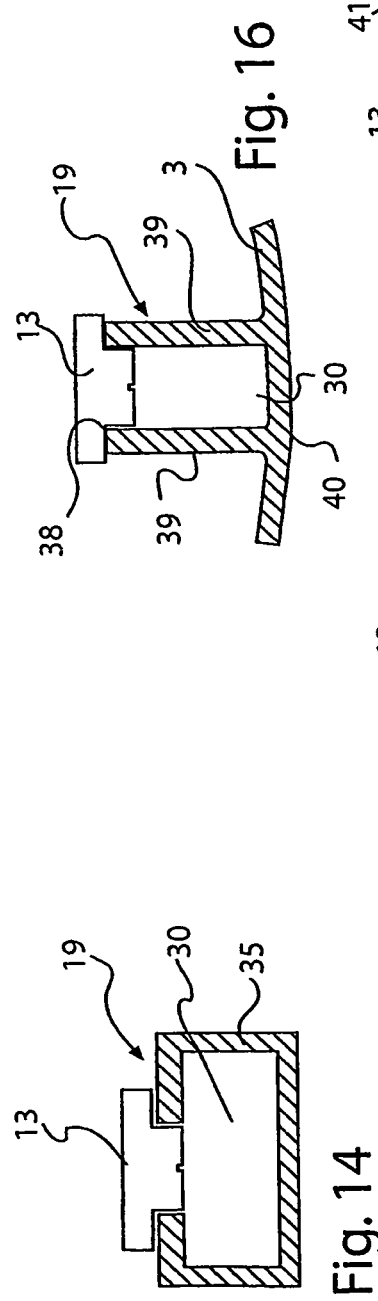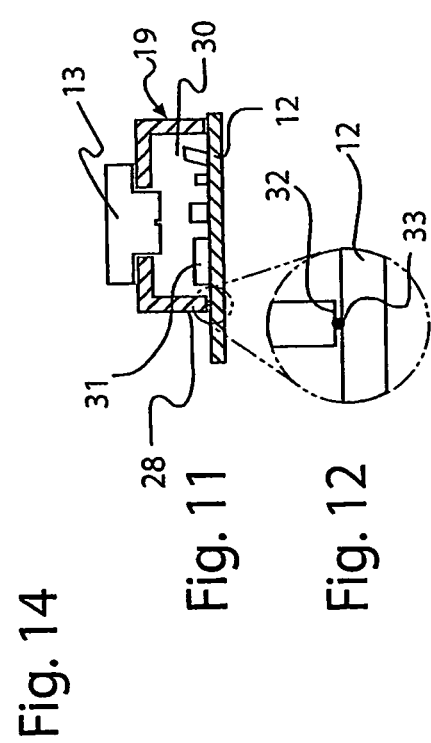

ELECTRONIC PEN

CROSS-REFERENCE TO RELATED APPLICATIONS

The present application claims the benefit of Swedish patent application No. 0600389-1, filed on Feb. 22, 2006, and U.S. provisional patent application No. 60/743,361, filed on Feb. 27, 2006, both of which being hereby incorporated by reference.

TECHNICAL FIELD

The present invention relates to an electronic pen having a positioning system for detecting the position of the tip of the pen and an audio system configured to output audio signals responsive to the detected position of the tip.

BACKGROUND ART

Electronic pens can be used for various purposes, for instance scanning, position detection, etc. Examples of the mechanics and structures of such electronic pens are disclosed for instance in applicant's WO 03/001358, WO 02/093467 and WO 02/103623. Further examples of the mechanics, optical systems and software of such electronic pens are disclosed for instance in applicant's WO 06/006925, WO 06/004506, WO 05/057471, WO 03/069547, WO 03/046708 and WO 03/001440, and references therein.

Recently, a special type of such electronic pens with audio feedback capability has gained success on the market. In particular, these audio-enabled pens are designed for the toy and learning market. Such pens are marketed under the product name "FLY™ Pentop Computer" by Leapfrog Enterprises, Inc. A pen of this structure has a casing and a tip projecting from the same. An optical scanner is arranged in the casing to capture images of the surface on which the pen is operated. The surface may be a so-called dot-matrix paper comprising a position-coding pattern. When a user moves the tip on this surface, processing circuitry in the pen processes the images to electronically determine the position and movement of the pen on the surface. The pen has an audio function which means that it outputs audio signals in response to certain "hits" or movements of the tip on the dot-matrix paper. For instance, if the tip is put on a map of the United States, a voice of the audio system may, via a speaker, tell you which state the tip is put on.

However, existing electronic pens of this kind have certain drawbacks which will be discussed in the following.

The pens are rather large sized, which makes them cumbersome and sometimes hard to handle. There is a demand for a small-size pen of compact structure.

Furthermore, certain parts contained in the known pens are fastened to the inside of the casing which may constitute weak attachment points. It may also happen that electric wires and contacts between the components loosen when the pen is dropped or thrown against something. For example, sensitive components can be destroyed if an impact on the tip is transferred into the interior of the pen.

As to the audio system, the speaker is often simply mounted on the inside of the pen casing, which means that it is exposed to the entire inner volume of the large-size pen. This may result in poor sound quality, and it may also happen that the speaker comes loose from its attachment.

The manufacturing process of these pens is complicated since a plurality of parts and components are involved, some of which have to be connected by several electric wires which may come loose, as discussed above. A more effective and secure manufacturing process is desirable. Finally, the tamper proof function of these known pens is not sufficient since it is easy to dismantle the pen and manipulate the sensitive components.

SUMMARY OF THE INVENTION

An object of the present invention is to eliminate or at least reduce the disadvantages discussed above and thereby to provide an electronic pen structure which is improved over prior art.

This object, and further objects which will appear from the following description, have now been achieved according to the invention by provision of an electronic pen, an audio module, a component mounting unit and a locking arrangement having the features set forth in the appended independent claims. Preferred embodiments are defined in the appended dependent claims.

In a first aspect of the invention, the positioning and audio modules of the electronic pen form a unitary component mounting unit which constitutes a compact structure. The compact mounting unit brings out several advantages. It is easy to handle as a unit in the assembly process. Further, the outer configuration of the mounting unit is easily adapted to the inner configuration of the casing, and vice versa. Another advantage is that various casings can be used for the same interior, i.e. the same mounting unit.

In one embodiment, the positioning module includes a first carrier member and the audio module includes a second carrier member. The two carrier members are connected to form a carrier structure. One printed circuit board (PCB) of the positioning module may be attached to the first carrier member and another printed circuit board (PCB) of the audio module may be attached to the second carrier member. This structure may be advantageous for several reasons. First, the tolerance requirements of the positioning module may be high since it may require precise spatial arrangement of components. Hence, the positioning module can be produced in a separate production line of high standard with respect to tolerances, clean environment, etc. On the other hand, the audio module can be produced in another production line where the tolerance requirements etc are not that crucial. Furthermore, either of the modules can be replaced should any defect occur during testing or after sale.

The connecting means between the two carriers and thereby between the two printed circuit boards may provide at least one of mechanical and electrical connection. In one embodiment, this connecting means comprises a so-called board-to-board connector having projecting contact pins for each printing circuit board. Thereby, electric wires may be avoided, or at least minimized, between these boards, to facilitate manufacture and allow for automation in production.

In one embodiment, the connection between the two carrier members comprises means for damping impacts on the mounting unit caused by impacts on the tip of the pen. By this structure, the risk that sensitive components of the mounting unit are damaged if the pen is dropped on the tip is reduced. In a preferred embodiment, this connection and damping means comprises at least partially elastic parts of the carrier members which further reduce the risk of damage to internal components of the pen.

According to a second aspect of the invention, the audio module of the electronic pen has an audio box to which a speaker is attached. Thanks to the audio box contained in the casing of the pen the sound quality may be improved.

The audio box may be formed by wall portions of the mounting unit carrying the audio module and/or by wall portions projecting from the inside of the casing. The wall portions may form an opening in which the speaker is disposed, and the wall portions and the speaker may define a closed space of the audio box. By this structure, a compact audio box may be achieved.

In one embodiment, the audio box is formed by walls of the second carrier member of the audio module, wherein the walls define an opening opposite to and spaced from the speaker opening. The opposite opening is closed by the second printed circuit board of the audio module, and the closed space of the audio box is defined by the speaker, the carrier member walls and the second printed circuit board. Since this structure makes use of a printed circuit board as a wall of the closed space of the audio box, components of the board can be contained in the space of the audio box and thereby protected. For example, an antenna can be contained in this space. Furthermore; this structure makes it possible to reduce the overall size of the pen.

In a third aspect of the invention, the casing of the pen comprises a main casing member and a front casing member connected to the main member by a locking pin extending transversely through the casing via bores in the walls of the main and front members. The locking pin provides a tamper proof structure.

In one embodiment, the locking pin projects from the outer surface of the casing on opposite sides. The opposite projections of the locking pin are configured to engage with matching recesses provided on the inside of a protective cap to detachably connect the cap to the front member of the pen. The matching engagement between the opposite projections of the locking pin and the matching recesses may provide a favorable snap-in connection.

BRIEF DESCRIPTION OF THE DRAWINGS

The invention and its many advantages will now be further described, reference being made to the accompanying drawings showing presently preferred, exemplifying embodiments.

FIG. 11 is a schematic sectional view of the audio box shown in FIG. 10.

FIG. 12 shows a detail of FIG. 11 on a larger scale illustrating a sealing element.

FIGS. 13-17 show different embodiments of the audio box of the audio module.

DESCRIPTION OF PREFERRED EMBODIMENTS

Figure 1:
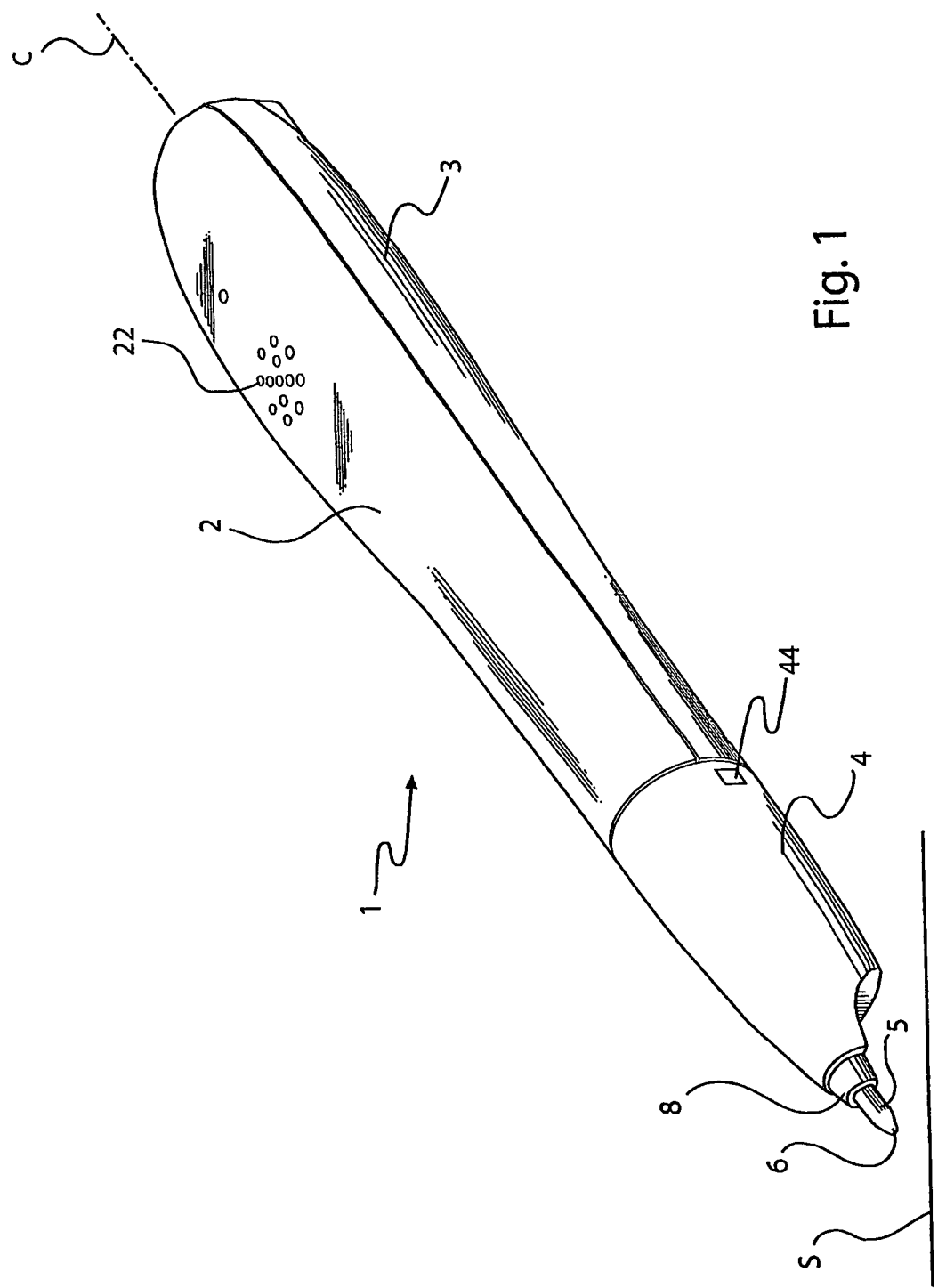
FIG. 1 shows an electronic pen according to an embodiment of the invention.

An electronic pen 1 according to a first embodiment of the present invention is shown in FIG. 1. The pen 1 has a tubular main casing member consisting of two shells 2 and 3, and a tubular front casing member 4 from which a pen stem 5 having a tip 6 projects. The shells 2, 3 are joined to each other and to the front member 4, and the casing or body structure 2-4 is locked by means of a locking pin 44 to be further described.

Figure 2:
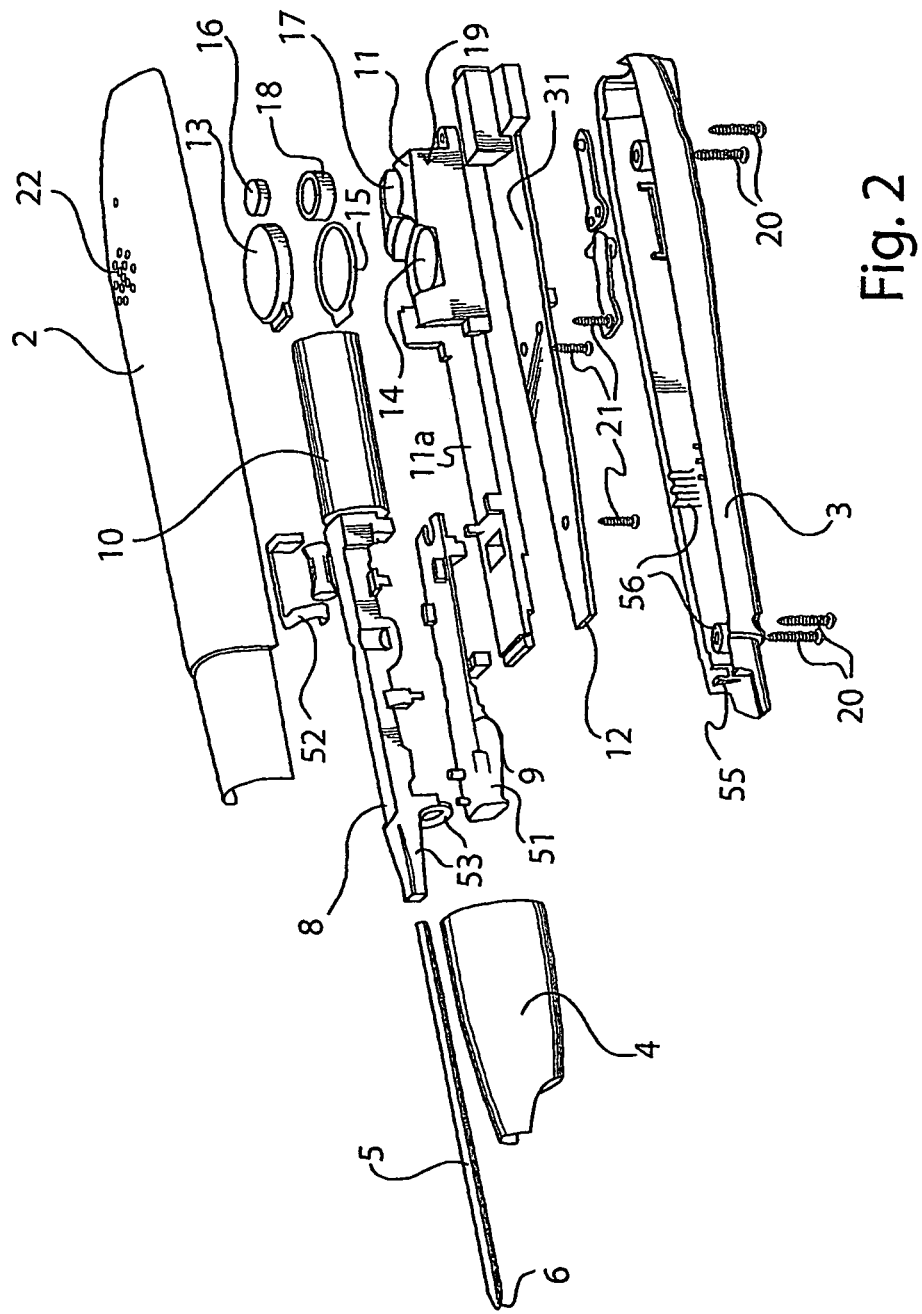
FIG. 2 is an exploded view of the pen showing its main parts.

FIG. 2 shows the shells 2, 3 spaced apart and the parts and components contained in the casing 2-4 of the pen 1. A positioning module or arrangement comprises a front carrier 8 and a first printed circuit board (PCB) 9. An audio module or arrangement comprises a rear carrier 11, a second printed circuit board (PBC) 12 and a speaker 13. The rear carrier 11 has a seat 11a for receiving a battery 10, and an opening 14 for receiving the speaker 13.

When mounting the speaker 13, a ring shaped seal 15 is placed between the speaker 13 and a portion of the rear carrier 11 surrounding the opening 14. In a corresponding manner, a microphone 16 is received in an opening 17 of the rear carrier 11. The microphone 16 is held in the opening 17 by means of an elastic element 18 configured to damp or absorb impacts (sound, vibrations, etc) which may disturb the microphone 16. The wall portions of the rear carrier 11 at the speaker opening 14 form an audio or resonance box 19 to be further described.

The shells 2, 3 are assembled to a pen casing by means of a number of screws 20, and the two PCBs 9, 12 and the two carriers 8, 11 are assembled by screws 21.

The PCBs 9, 12 comprise a plurality of electronic components which will not be described in detail here. However, it should be mentioned that the first PCB 9 of the positioning module has an optical sensor (not shown) included in a camera system 51 for recording images of a surface S, for instance a dot-matrix paper (see FIG. 1). The positioning module also includes a contact sensor 52 operatively connected to the pen stem 5, wherein the camera system 51 is selectively activated based on the output from the contact sensor 52. The second PCB 12 of the audio module has means for generating audio signals responsive to the detected position of the tip 6 on the surface S. The audio signals are output by the speaker 13 via a plurality of small apertures 22 in one of the shells 2.

The interactive electronic pen 1 also has processing circuitry (not shown) controlling various functions and connected to the battery 10. This processing circuitry, which is implemented by components attached to the PCBs, is not described here.

Figure 3:
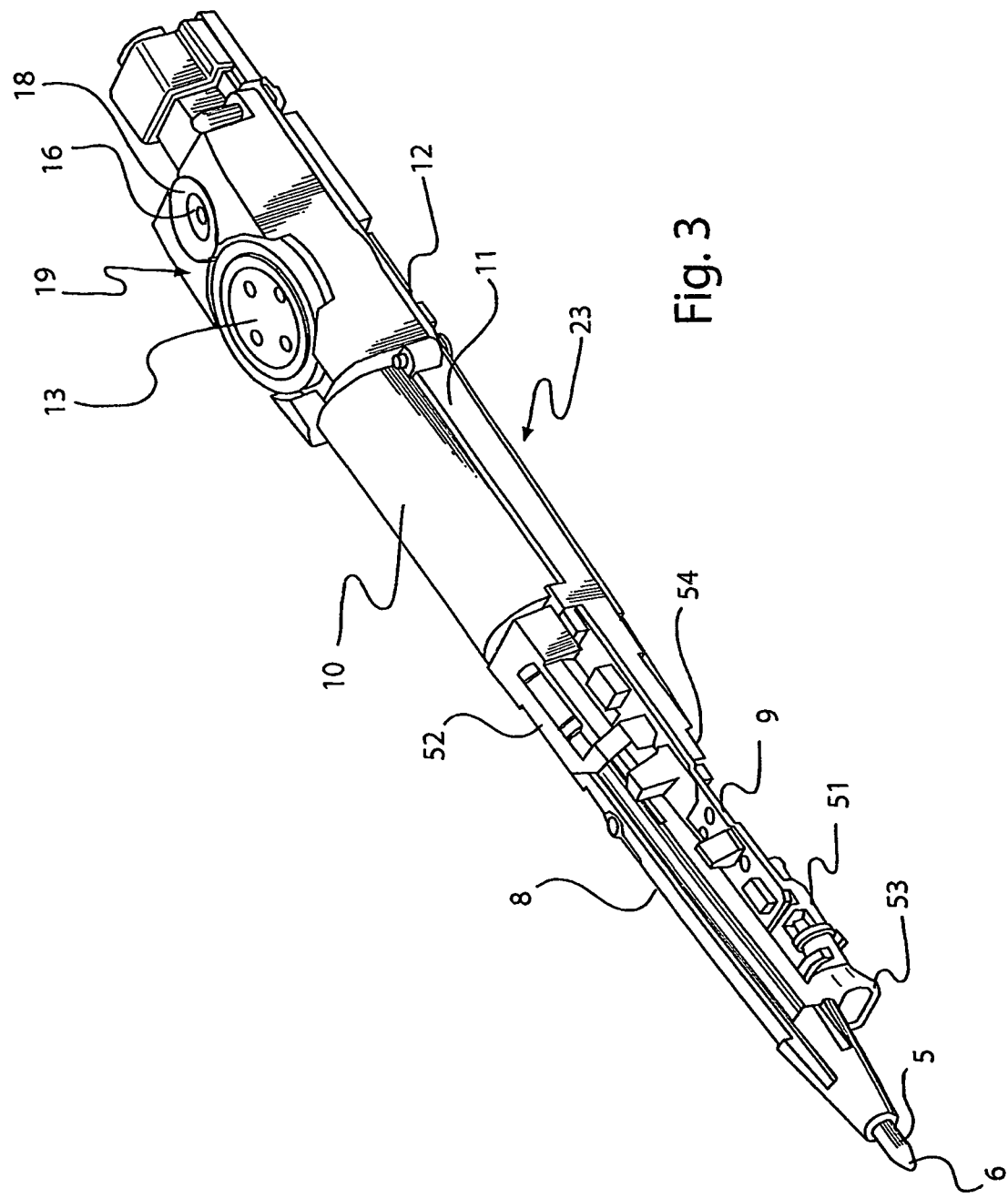
FIGS. 3-4 show a component mounting unit of the pen from two directions.
Figure 4:
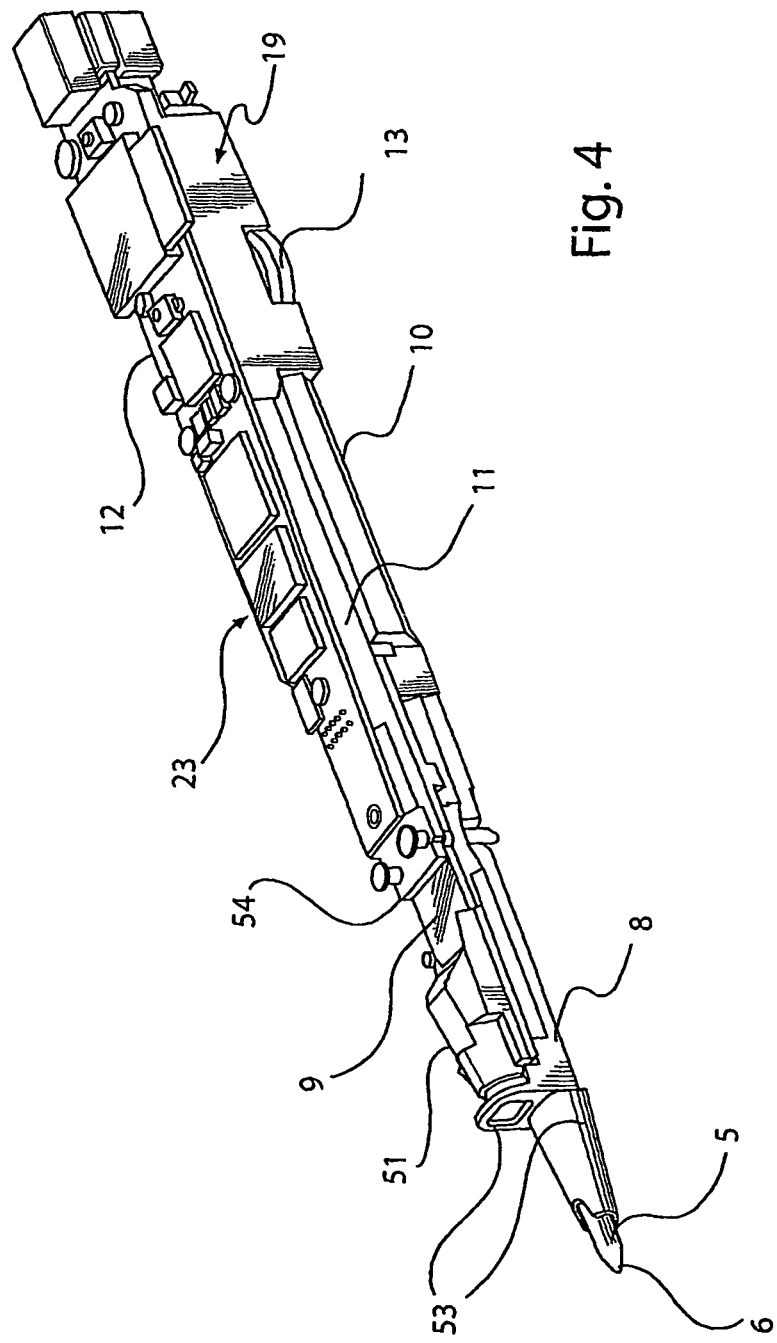

FIGS. 3-4 show the positioning module and the audio module assembled to a unitary component mounting unit 23 to be placed in the casing 2-4 of the pen 1. This compact mounting unit 23 is easy to handle in the assembly process, and it almost fills the space within the pen casing. There are no loose parts, and no electric wires.

The mounting unit 23 has external fixing or engaging means 53, 54 matching internal fixing/engaging means 55, 56 on the inside of the shells 2, 3 (see FIG. 2). These matching means may physically connect to each other, so as to fixedly attach the mounting unit to the shells, or they may interact to merely control the mutual location of the mounting unit and the shells. Further fixing means of this kind can be provided in the mechanical interface between the mounting unit 23 and the inside of the casing 2-4. The fixing/engaging means may include ribs, flanges, hooks, towers, projections, lips, recesses, grooves, slots, etc.

Figure 5:
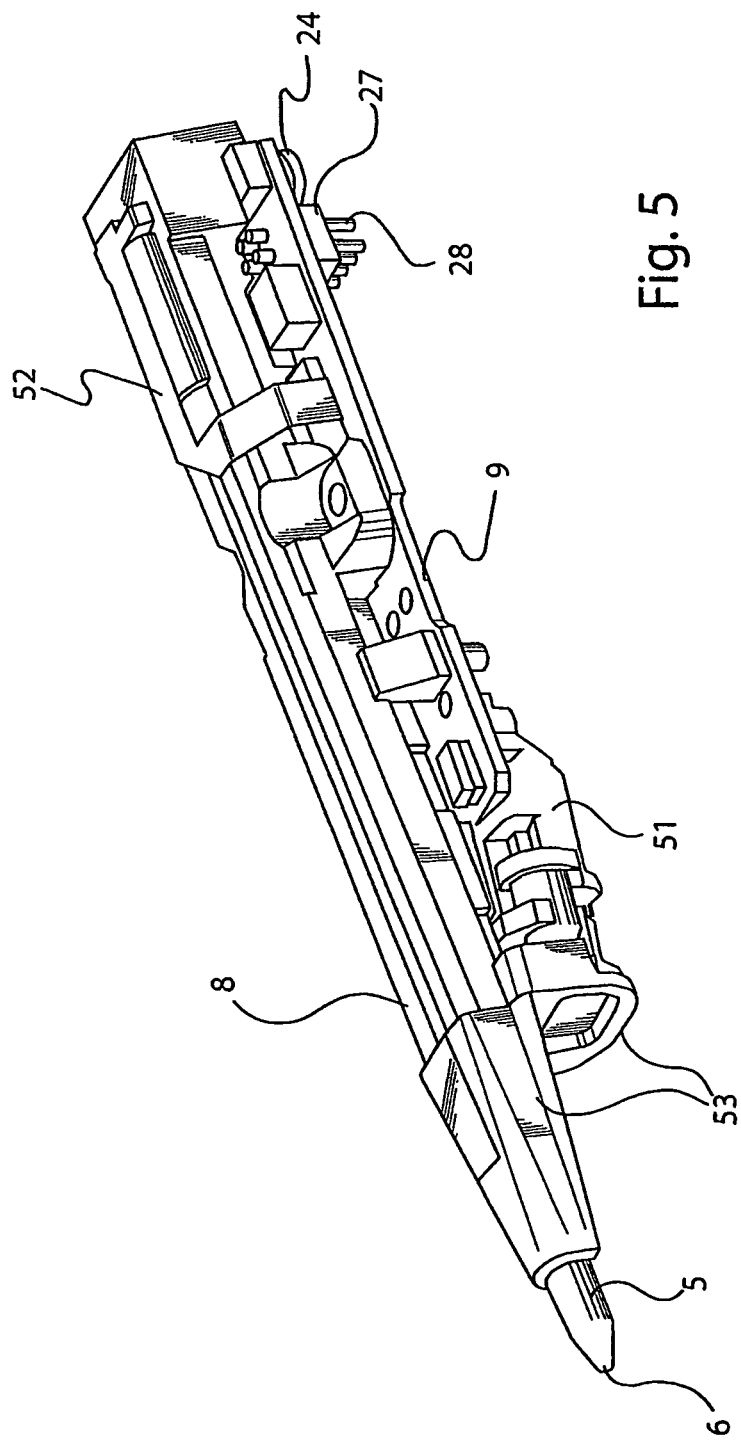
FIGS. 5-6 show a positioning module of the mounting unit from two directions.
Figure 6:
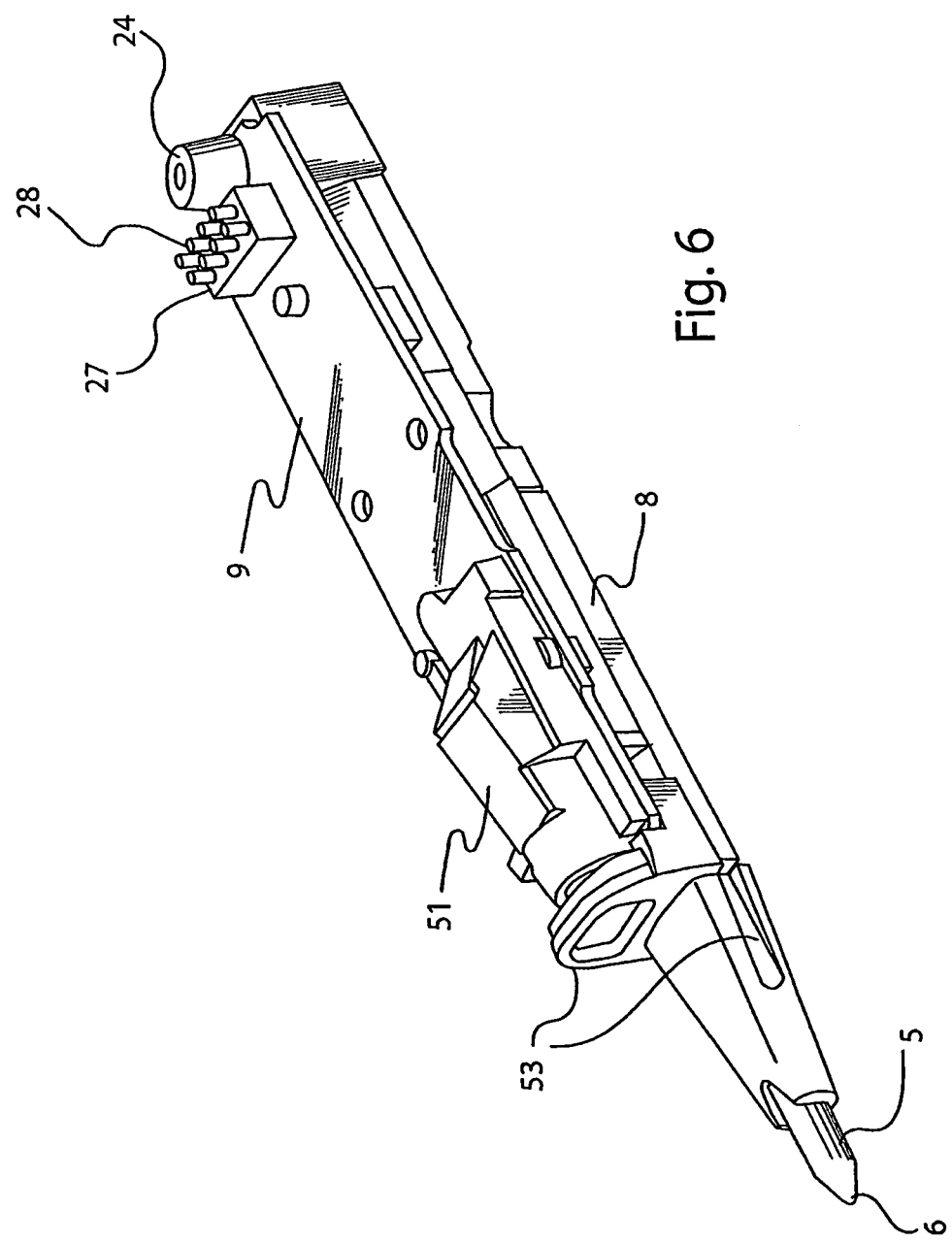

In FIGS. 5-6 the positioning module is shown separately. This module can be produced in a separate production line with high quality requirements, for instance with respect to tolerances. In order to ensure accurate position detection, it is important that the optical components and other elements involved are attached in a firm and well-defined manner. An advantage of this separate production of the positioning module is that the camera system 51 and the front PCB 9 can be assembled in a clean and dust-free environment, e.g. in a so-called clean room.

Figure 7:
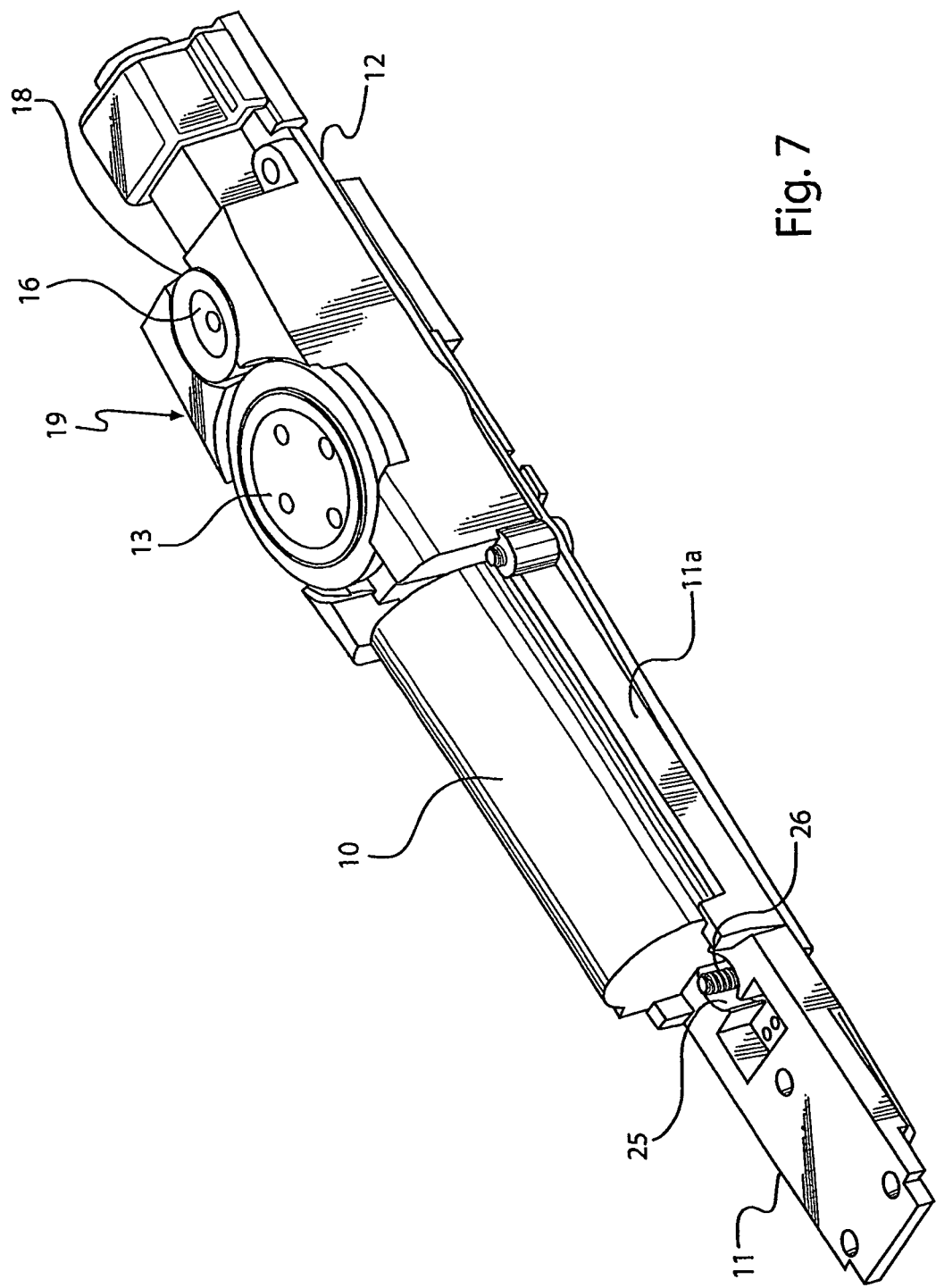
FIGS. 7-8 show an audio module of the mounting unit from two directions.
Figure 8:
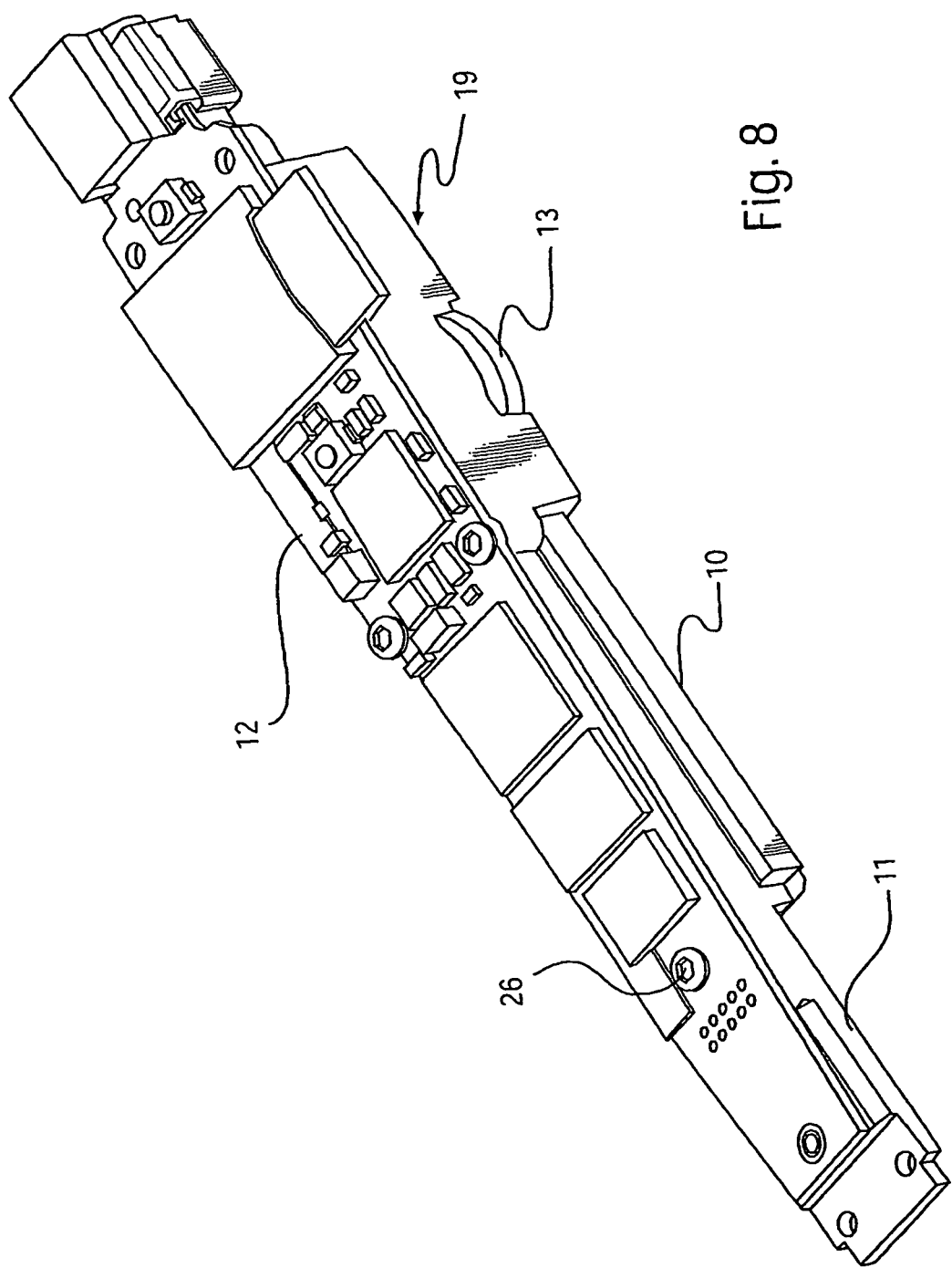

The audio module is shown separately in FIGS. 7-8. This module can also be produced in a separate production line where the requirements of tolerances, etc, may be lower than in the position module production.

Figure 9:
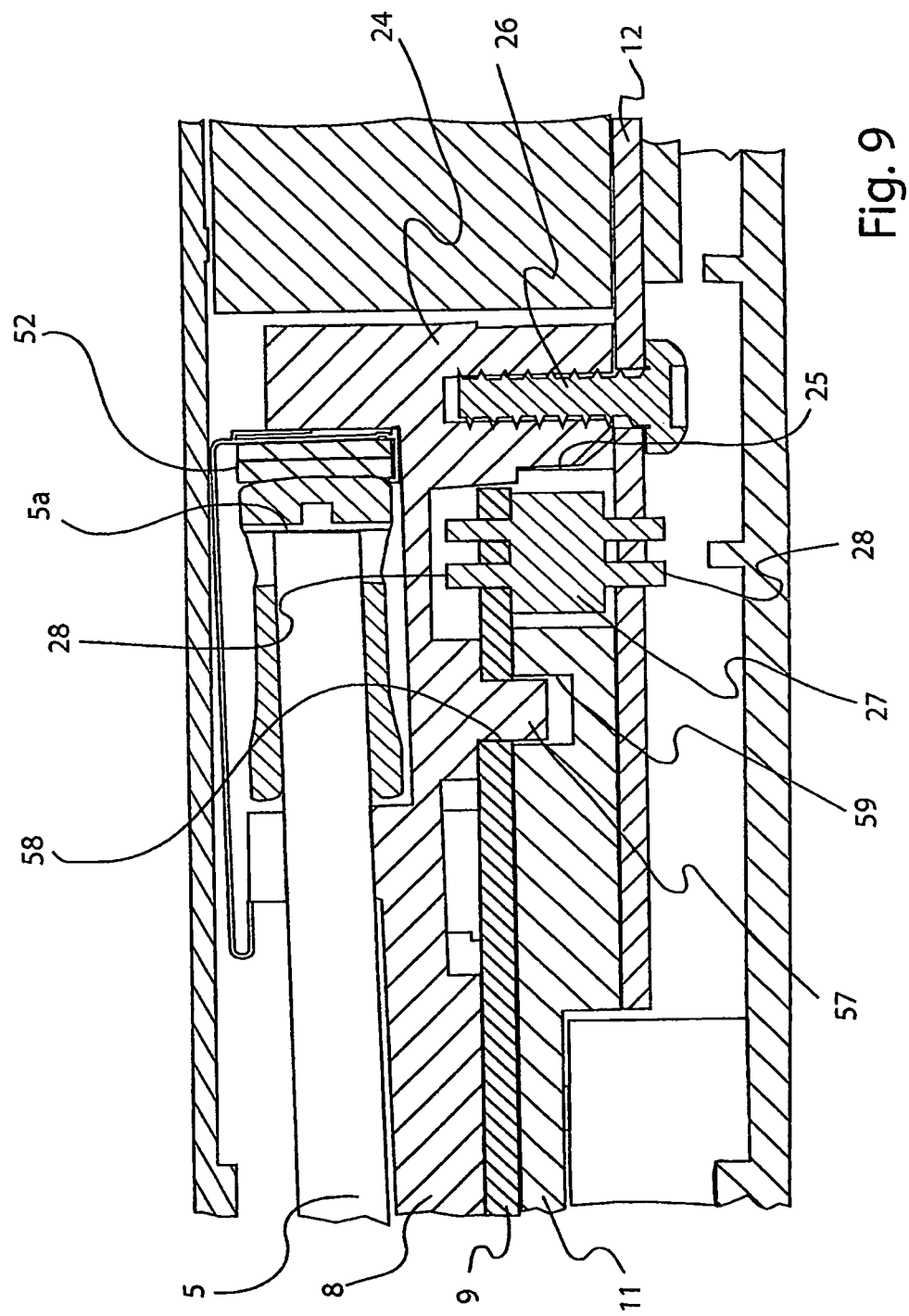
FIG. 9 is a sectional view of a connection between the positioning module and the audio module.

In FIG. 9 the connection between the positioning module and the audio module is shown in detail. The carrier 8 of the positioning module has a tubular projection 24 matching a recess 25 of the carrier 11 of the audio module (se FIG. 7). The carriers 8 and 11, each having a major extension essentially in the axial direction of the pen, are connected to each other by a screw 26 extending from the recess 25 into the tubular projection 24. In order to obtain an impact damping effect, the tubular projection 24 may be at least partially elastic. If the pen 1 is dropped causing an impact on the tip 6 of the pen 1, this impact is transferred via the pen stem 5 to the inner end 5a of the same and damped by the elastic joint between the carriers 8 and 11. The resulting axial impact is taken up and damped by the interface between the tubular projection 24 and the stem of the fastening screw 26. The risk of damage to the components of the PCBs 9, 12 due to the impact is reduced. In an alternative embodiment (not shown), the projection 24 is instead provided on the second carrier 11 to extend into a recess 25 in the first carrier 8, again with the projection preferably being at least partially elastic. In yet further embodiments (not shown), the material defining the recess may be at least partially elastic, instead of or in addition to the material of the projection. Based on the illustrated embodiment, the skilled person will be able find further alternative implementations of the elastic joint between the carriers. For example, two otherwise axially movable carriers may be combined by one or more elastic fasteners (rivet, screw, etc) that extend through an overlapping section of the carriers so as to absorb axial impacts. In another example, two non-overlapping carriers may be joined by an intermediate linkage made of elastic material or designed to have an elastic effect to axial impacts.

Returning to the example of FIG. 9, a further projection 57 from the front carrier 8 is received in a matching aperture 58 of the front PCB 9 and in a matching recess 59 of the rear carrier 11. This matching coupling may contribute to a favorable mechanical connection between the positioning and audio modules.

Further connecting means is shown in FIG. 9, namely the connecting member 27 which connects the two PCBs 9 and 12 to each other. The connecting member 27 has projecting connecting pins 28 received in matching bores in the respective PCBs 9 and 12. These pins 27 provide electric connection between the PCBs 9 and 12 without any electric wires, thereby potentially simplifying assembly of the PCBs and increasing reliability and durability of the electrical connection. In one embodiment, the connecting member 27 is a so-called board-to-board connector. Alternatively or additionally, an electrical wire assembly may be used to electrically connect the PCBs, e.g. via terminal blocks, plug and socket connectors, screw terminals, soldering, etc.

Figure 10:
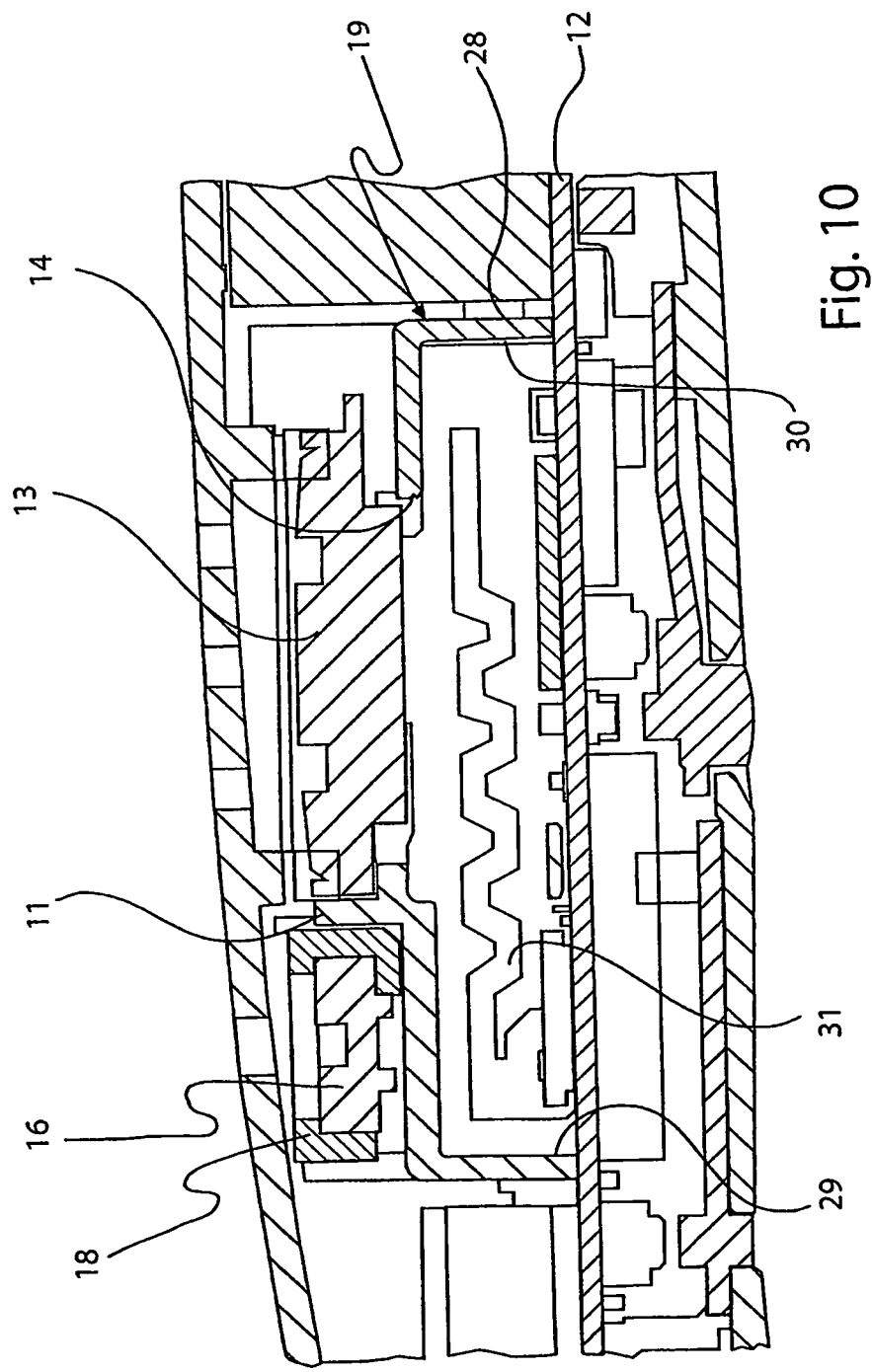
FIG. 10 is a sectional view of an audio box of the audio module.

The audio box 19 of the audio module is shown in detail in FIG. 10, to which reference is now made. As discussed above, the speaker 13 is disposed in an opening 14 of the rear carrier 11. The audio box 19 is built up by a wall portion 28 of the carrier 11. The wall portion 28 defines an opening 29 opposite the speaker opening 14. This opening 29 is closed by the second PCB 12. Thus, a closed space 30 inside the audio box 19 is defined by a rear surface of the speaker 13, the wall portion 28 and the PCB 12. This closed space 30 provides favorable conditions for good sound quality. The volume, shape and wall properties of the closed space 30 may affect the sound quality and can for that reason be modified depending on the requirements. It is to be noted that "closed space", in this and other embodiments, also includes an essentially closed space in which well-defined perforations or small apertures are provided in any one of the walls of the audio box, e.g. to improve sound quality.

The arrangement in FIG. 10 has the general advantage of saving space inside the pen, by eliminating any spacing between the audio box 19 and the PCB 12. Further space may be saved by arranging the PCB 12 with components 31 extending into the closed space 30 of the audio box 19. Thus, the radial and/or axial extension of the pen may be reduced, or more components may be accommodated in a pen of a given size.

Another advantage of the audio box 19 is that sensitive components of the second PCB 12, such as an antenna 31 for wireless-transmission of signals from the pen, can be contained within the closed space 30 of the audio box 19. Thereby, the risk of damage to these components is reduced both in production and in use, should anyone open the pen casing.

The audio box 19 is shown schematically also in FIGS. 11 and 12. The wall edge portion 32 defining the opening 29 is sealed against a surface of the second PCB 12. A sealing element 33 is disposed in the interface between the wall edge portion 32 and the surface of the PCB 12.

FIG. 13 shows an alternative embodiment of the audio box 19 where the speaker 13 is disposed in a rear wall 34. The PCB 12 extends into the space 30, for example to protect any sensitive components 31. This rear position of the speaker 13 may be desirable to further reduce the radial extension of the pen.

In FIG. 14 there is shown another alternative embodiment of the audio box 19 where the closed space 30 is formed only by walls 35 of the rear carrier 11. No PCB is within the space 30. This embodiment may be preferred in cases where a rather thick casing of the pen 1 is feasible.

In an embodiment not shown here, an audio box 19 similar to the one of FIG. 14 is manufactured as a separate part which is attached to the inside of the casing and/or firmly engaged with and held by the shells 2, 3.

FIG. 15 shows still another embodiment of the audio box 19 where the speaker 13 is disposed in an opening 36 in the PCB 12 which defines the closed space 30 together with the wall 37 of the rear carrier 11.

In FIG. 16 the speaker 13 is disposed in an opening 38 defined by wall portions 39 which extend from the inside of the shell 3 and towards the centre axis C of the pen 1. In this embodiment, the closed space 30 of the audio box 19 is defined by the speaker 13, the projecting wall portions 39 of the shell 3 and the outer wall 40 of the shell 3.

Another embodiment is shown in FIG. 17 where the audio box 19 is formed by a first wall portion 41 of the rear carrier 11 and a second wall portion 42 consisting of projections from the shell 3. Alternatively, the second wall portion 42 may be part of the front carrier 8. In order to have a large space 30 of the audio box 19, the PCB 12 extending inside the space 30 may have one or more openings 43, especially if the PCB 12 is wide enough to cover the entire interface between the top space, defined by wall portion 41, and the bottom space, defined by wall portion 42.

Figure 18:
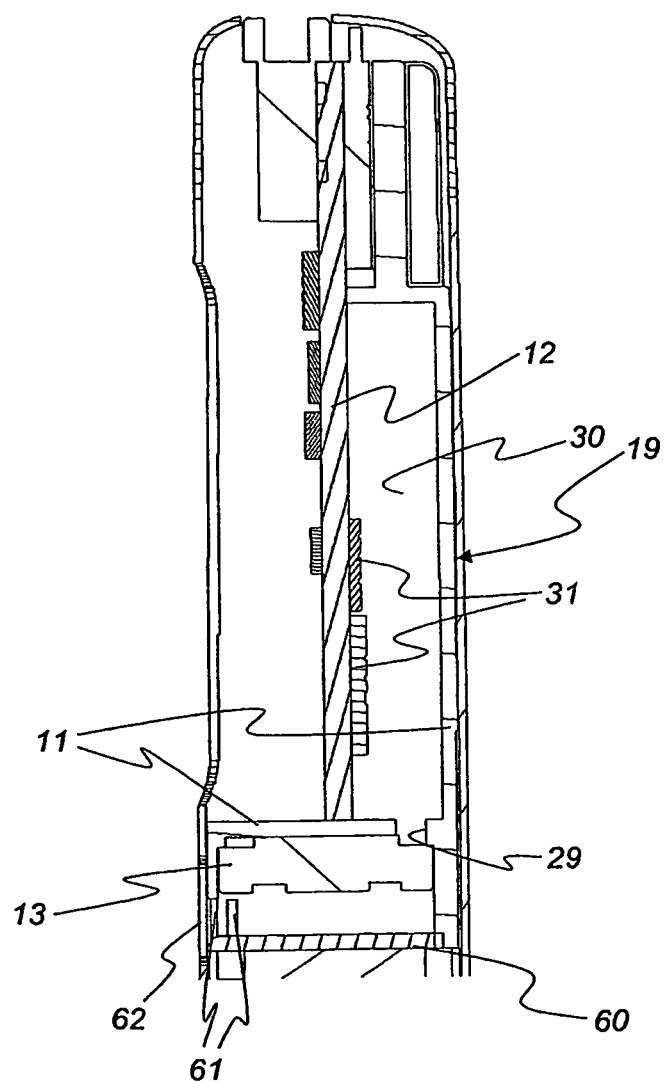
FIG. 18 is a longitudinal section of a rear end of an electronic pen, showing yet another embodiment of an audio box.

FIG. 18 shows an audio box arrangement in another embodiment of an electronic pen. The audio box 19 is defined by wall portions of the rear carrier 11 and the PCB 12. The audio box is closed off by the rear surface of the speaker 13 via an opening defined by the wall portions. A peripheral seat is defined by the carrier 11 to locate the speaker 13 with its sound-generating front surface facing in the axial direction of the pen (compare axis C in FIG. 1). Thus, the front surface of the speaker 13 does not face directly to the shell, but faces a cylindrical output space which is defined by the shell, a non-perforated stop plate 60 and the front surface of the speaker 13. Radial openings 62 are defined in the shell to transmit generated sound out of the pen. This arrangement of the speaker 13 may serve to reduce the radial extension of pen.

Figure 19:
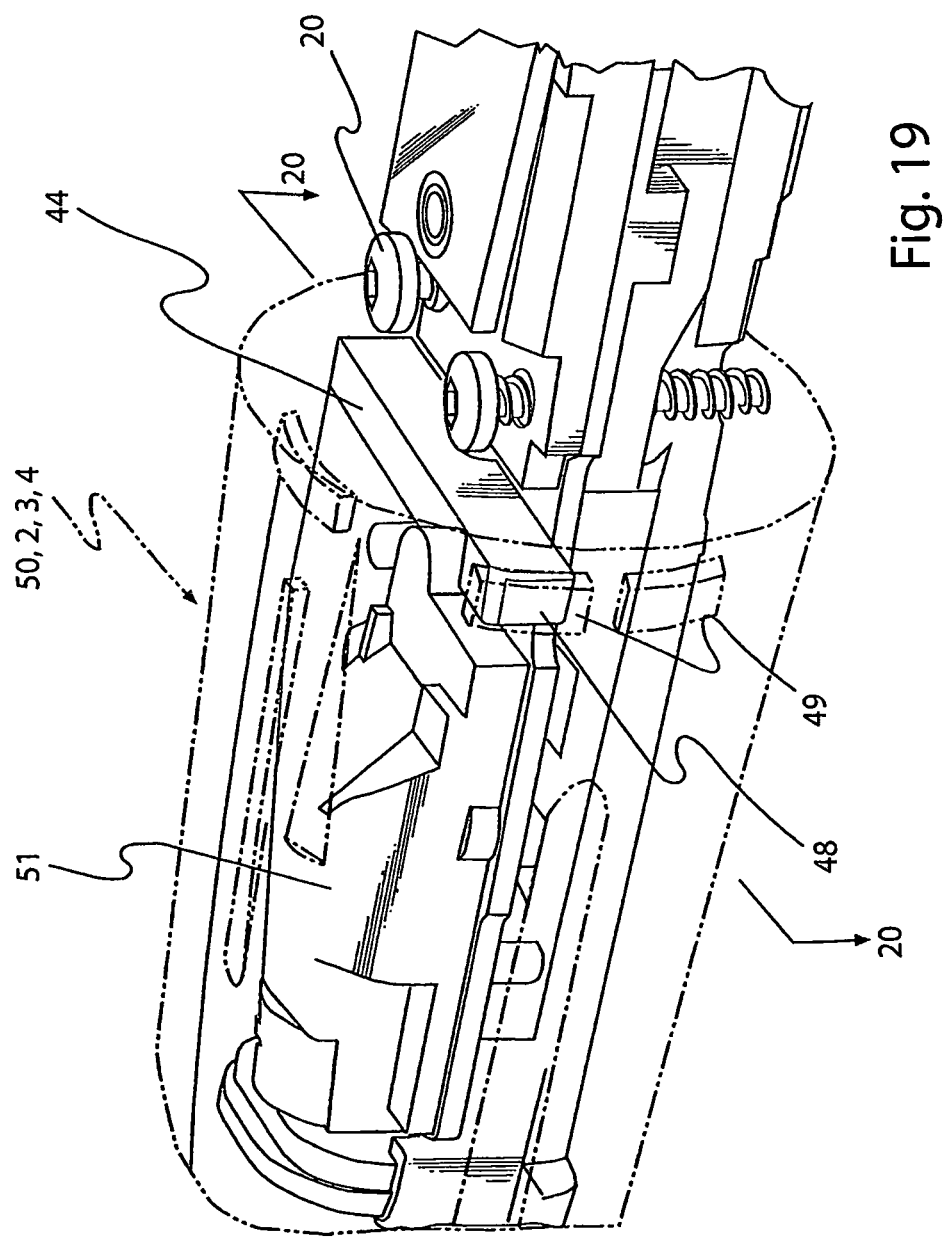
FIG. 19 shows a locking arrangement for locking a protective cap to a front casing portion of the pen shown in dotted lines.
Figure 20:
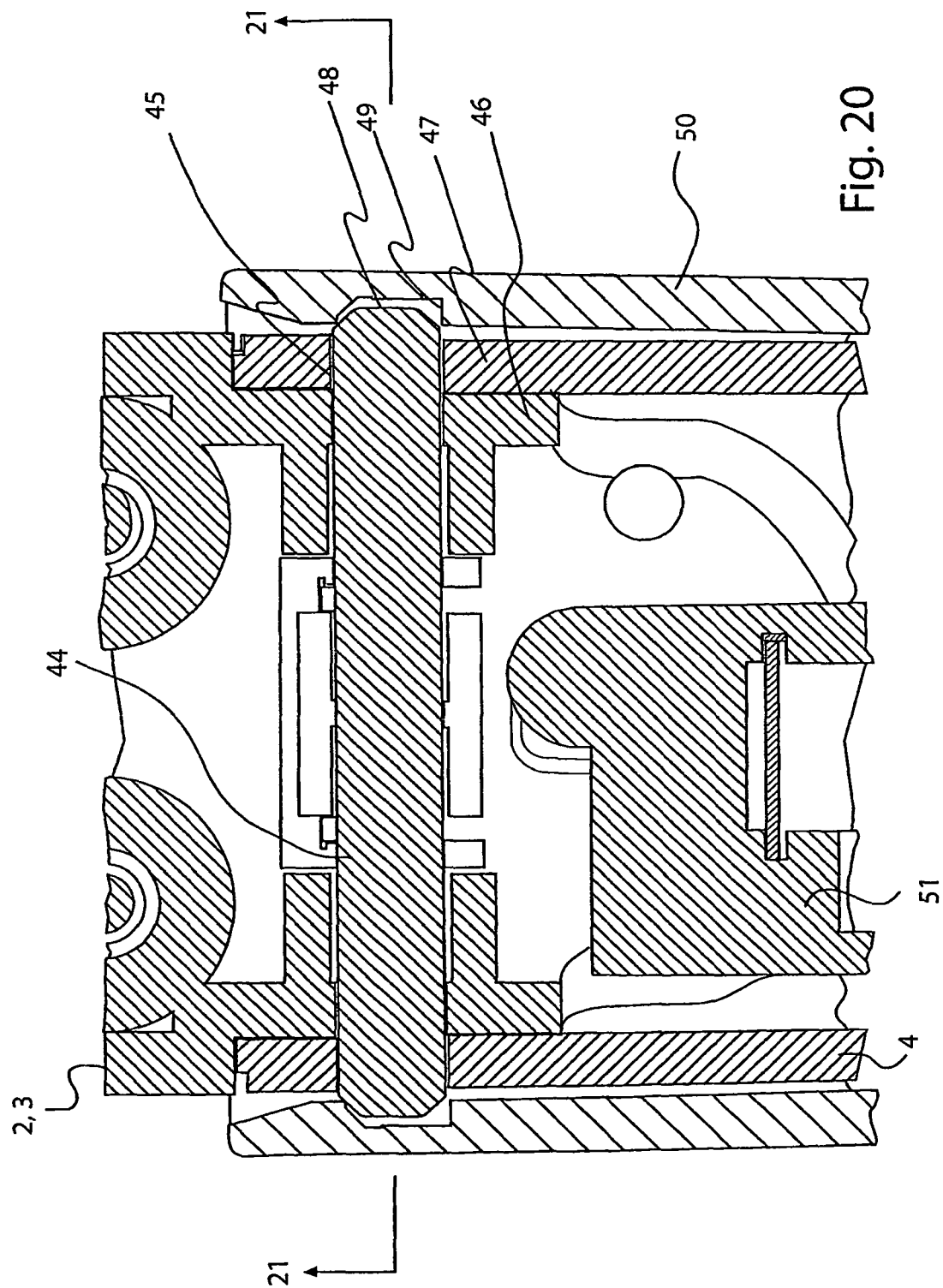
FIG. 20 is a section taken along line 20-20 in FIG. 19 showing a locking pin.
Figure 21:
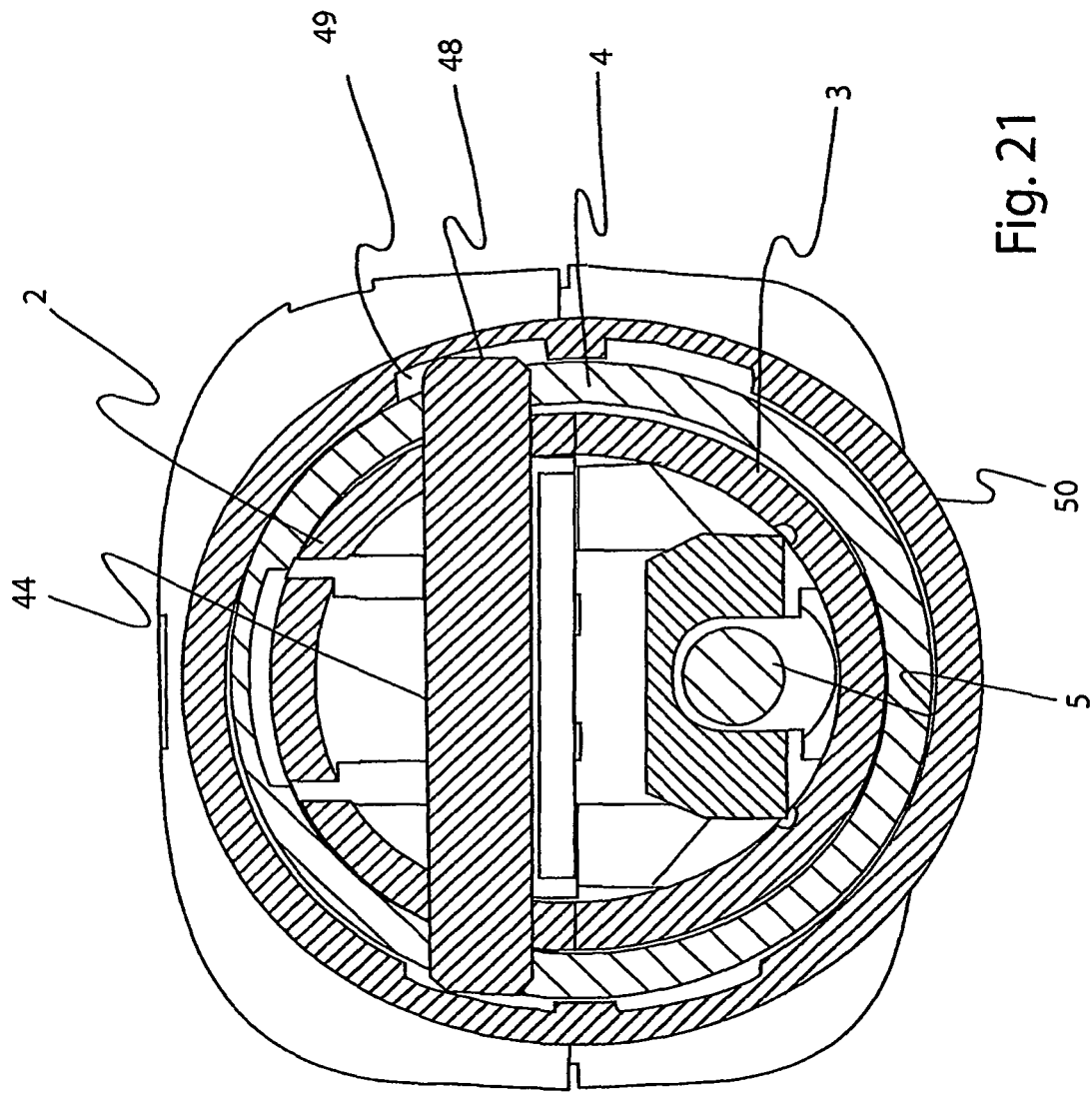
FIG. 21 is a cross-section taken along line 21-21 in FIG. 20 showing the engagement between the locking pin and the cap.

A locking pin arrangement is shown in FIGS. 19-21 where the front casing member 4 is connected and locked to the main casing member 2, 3 by a locking pin 44 extending transversely through the casing via bores 45 in the walls of the main casing member 2, 3 and the front casing member 4. As a result, a tamper proof structure is achieved (see FIG. 19).

FIG. 20 shows that the main body member 2, 3 has a first coupling portion 46 which is inserted into a matching second coupling portion 47 of the front casing member 4. The locking pin bores 45 are provided in these coupling portions 46, 47.

In an embodiment which is not shown, the locking pin 44 also extends through bores of the mounting unit 23, thereby providing a further tamper proof effect, as well as potentially increasing stability and durability of the pen.

Preferably, the locking pin 44 cooperates with the casing 2-4 and/or the mounting unit 23 to form a one-way locking structure, which allows mounting of the pin 44 but pre-vents removal of the same without breaking the locking structure. To this end, the locking structure may be of the snap-in type. For example, the pin 44 may have a groove arrangement which engages with one or more projections, such as ribs, flanges, or tabs arranged at the bores 45 or at corresponding bores in the mounting unit 23.

As seen in FIGS. 20-21, the locking pin 44 projects from the outer surface of the front casing member 4 on opposite sides. These opposite projections 48 are configured to engage with matching recesses 49 provided on the inside of a protective cap 50 to detachably connect the cap 50 to the front casing member 4 of the pen 1. The engagement between the projections 48 of the pin 44 and the recesses 49 is preferably of the snap-in type. For reasons of durability, the projections 48 may be provided with or made from a more wear-resistant material than the center portion of the pin 44.

Figure 22:
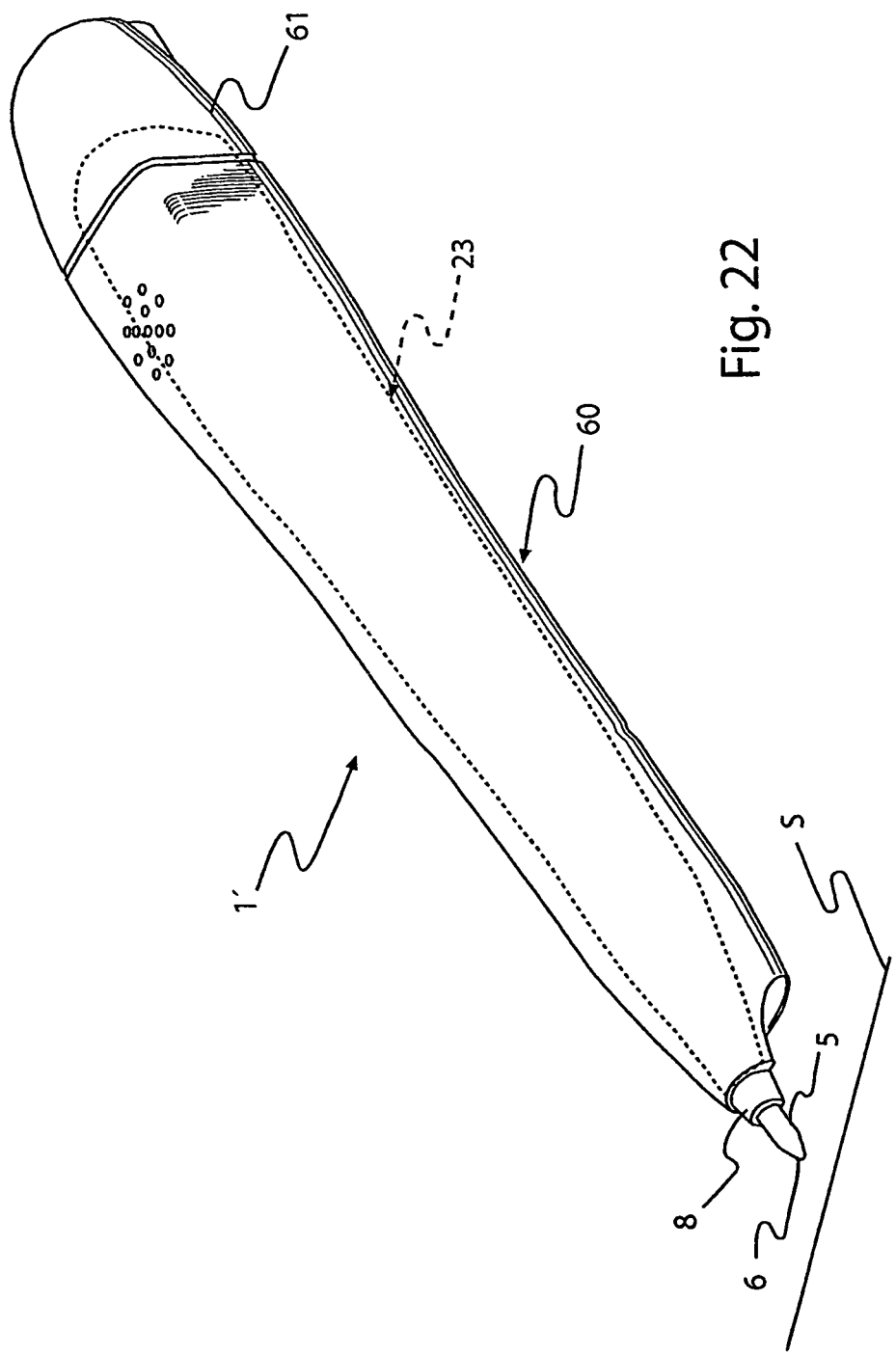
FIG. 22 shows an electronic pen having an alternative casing structure.

Finally it should be mentioned that the inventive concept is by no means restricted to the description above, and several modifications of the inventive concept are feasible within the scope of the appended claims. For instance, the casing of the pen may be of other structure (see FIG. 22). Instead of a main casing member consisting of two shells and a front casing member, the pen may have one tubular main casing 60 in one piece into which the component mounting unit 23 is inserted and fixed by a rear casing member 61. The casing 60, 61 has internal fixing means co-operating with external fixing means of the mounting unit 23 (not shown).

In yet other embodiments, the positioning and audio modules may include a common unitary carrier forming part of the mounting unit, and the modules may include a common printed circuit board attached either to such a common carrier or to separate front and rear carriers.

As to the audio box, further embodiments with respect to the arrangement of the speaker in wall openings of the audio box are feasible.

It is also to be realized that the above embodiments may be implemented in electronic pens that utilize any other technique for determining the position of the pen tip, such as accelerometer(s), roller ball(s), triangulation, magnetic sensor(s), etc. It is also to be understood that the general principles of the audio module and the locking arrangement can be implemented in electronic pens with or without a common mounting unit.

The invention claimed is:

1. An electronic pen comprising
a casing,
a tip to be put on a surface,
a positioning module for detecting the position of the tip on the surface, and
an audio module configured to output audio signals responsive to the detected position of the tip on the surface,
wherein the positioning and audio modules form a unitary component mounting unit contained within the casing of the pen,
wherein the positioning module includes a first carrier member and the audio module includes a second carrier member, said carrier members being connected to form a carrier structure, and
wherein the positioning module has a first printed circuit board attached to the first carrier member, and the audio module has a second printed circuit board attached to the second carrier member.

2. An electronic pen as claimed in claim 1, further comprising connecting means configured to provide at least one of mechanical and electrical connection between the two printed circuit boards of the respective carrier members.

3. An electronic pen as claimed in claim 2, wherein said connecting means comprises a connecting member which is arranged between the two printed circuit boards and which has projecting connecting pins for providing electrical connection to the respective printed circuit boards.

4. An electronic pen as claimed in claim 1, wherein said connection between the two carrier members comprises means for damping impacts on the mounting unit caused by impacts on the tips of the pen.

5. An electronic pen as claimed in claim 4, wherein said connecting and damping means comprises a first connecting portion projecting from one of the carrier members and connected to a second matching connecting portion of the other carrier member, said connecting portions being attached to each other by fastening means.

6. An electronic pen as claimed in claim 5, wherein at least one of said first and second connecting portions is at least partially elastic to achieve said damping of impacts.

7. An electronic pen as claimed in claim 5, wherein said first connection portion comprises a tubular projection of the first carrier member matching a recess of the second carrier member, wherein said fastening means comprises a screw or rivet extending from the recess and into the tubular projection.

8. An electronic pen as claimed in claim 1, wherein the audio module comprises an audio box to which a speaker is attached.

9. An electronic pen as claimed in claim 8, wherein the audio box is formed by wall portions of the mounting unit carrying the audio module and/or by wall portions projecting from the inside of the casing, wherein said wall portions form an opening in which the speaker is disposed and wherein said wall portions and the speaker define a closed space of the audio box.

10. An electronic pen as claimed in claim 9, wherein the opening for the speaker is formed in a wall portion of a carrier member of the mounting unit.

11. An electronic pen as claimed in claim 9, wherein the opening for the speaker is formed in a printed circuit board of the mounting unit.

12. An electronic pen as claimed in claim 9, wherein the opening for the speaker is defined by wall portions of the casing which extend from the inside of the casing and towards the centre axis of the pen.

13. An electronic pen as claimed in claim 9, wherein at least a portion of a printed circuit board extends in contact with the closed space of the audio box.

14. An electronic pen as claimed in claim 13, wherein the portion of said printed circuit board which is disposed in contact with the closed space of the audio box comprises electronic components.

15. An electronic pen as claimed in claim 13, wherein said printed circuit board extends into the closed space of the audio box.

16. An electronic pen as claimed in claim 8, wherein the audio box is formed by walls of said second carrier member of the audio module, said walls defining an opening which is opposite to and spaced from said speaker opening, said opposite opening being closed by said second printed circuit board of the audio module, wherein said closed space of the audio box being defined by said speaker, said carrier member walls and said second printed circuit board.

17. An electronic pen as claimed in claim 16, wherein the wall edge portion defining said opposite opening is sealed against a surface of said second printed circuit board defining the closed space of the audio box.

18. An electronic pen as claimed in claim 17, wherein a sealing element is disposed in the interface between said wall edge portion and said surface of the second printed circuit board.

19. An electronic pen as claimed in claim 16, wherein the portion of said second printed circuit board which is disposed within the closed space of the audio box comprises electronic components.

20. An electronic pen as claimed in claim 1, wherein said casing comprises a main casing member and a front casing member, said front casing member being connected to the main casing member by a locking pin extending transversely through the casing via bores in the walls of the main and front casing members, said locking pin providing a tamper proof structure.

21. An electronic pen as claimed in claim 20, wherein the main casing member has a first coupling portion which mates with a matching second coupling portion of the front casing member, said locking pin bores being provided in said coupling portions.

22. An electronic pen as claimed in claim 21, wherein the locking pin also extends through bores of the mounting unit.

23. An electronic pen as claimed in claim 20, wherein the locking pin projects outwardly from the outer surface of the casing on opposite sides thereof, said opposite projections of the locking pin being configured to engage with matching recesses on the inside of a cap to detachably connect the cap when placed over the front casing member of the pen.

24. An electronic pen as claimed in claim 1, wherein the casing comprises two elongate shells joined to form a main casing member, to which a front casing member is attached, said shells having internal fixing means matching corresponding fixing means of the mounting unit contained within the casing of the pen.

25. An electronic pen as claimed claim 23, wherein said locking pin extends transversely through and locks one of said shells.

26. An electronic pen as claimed in claim 1, wherein the casing comprises a tubular main casing member formed in one piece, and a rear casing member attached to a rear end of the main casing member, said casing having internal fixing means matching corresponding fixing means of the mounting unit contained within the casing of the pen.

27. An electronic pen as claimed in claim 1, wherein the positioning module comprises optical means for sensing a code on said surface.

28. An electronic pen as claimed in claim 1, wherein the audio module further comprises a microphone.

29. An electronic pen as claimed in claim 28, wherein the microphone is supported by an elastic element associated with a carrier member of the audio module.

* * * * *